(12) United States Patent
Bleth et al.

(10) Patent No.: US 9,135,589 B2
(45) Date of Patent: Sep. 15, 2015

(54) NAVIGATION BRIDGE

(71) Applicant: Yahoo! Inc., Sunnyvale, CA (US)

(72) Inventors: Jacqueline Bleth, Sunland, CA (US);
Erik Racho, Sierra Madre, CA (US);
Romeo J. Torres, Long Beach, CA (US); Mary Grace Whalen, Sherman Oaks, CA (US); Melisa Angulo, North Hollywood, CA (US)

(73) Assignee: Yahoo! Inc., Sunnyvale, CA (US)

( * ) Notice: Subject to any disclaimer, the term of this patent is extended or adjusted under 35 U.S.C. 154(b) by 321 days.

(21) Appl. No.: 13/669,899

(22) Filed: Nov. 6, 2012

(65) Prior Publication Data

US 2014/0129964 A1    May 8, 2014

(51) Int. Cl.
*G06Q 10/06* (2012.01)
*G06Q 30/02* (2012.01)

(52) U.S. Cl.
CPC ............ *G06Q 10/06* (2013.01); *G06Q 30/0241* (2013.01)

(58) Field of Classification Search
CPC ..................................... G06F 3/14; G06F 3/17
USPC ............ 715/200–277, 700–867; 345/30–111; 709/201–229; 705/8, 14, 50–79; 712/244
See application file for complete search history.

(56) References Cited

U.S. PATENT DOCUMENTS

| | | | |
|---|---|---|---|
| 2001/0044738 A1* | 11/2001 | Elkin et al. | 705/8 |
| 2004/0186775 A1* | 9/2004 | Margiloff et al. | 705/14 |
| 2007/0011334 A1* | 1/2007 | Higgins et al. | 709/227 |
| 2008/0134060 A1* | 6/2008 | Albrecht et al. | 715/762 |
| 2011/0078426 A1* | 3/2011 | Stoitsev | 712/244 |

* cited by examiner

*Primary Examiner* — Ruay Ho
(74) *Attorney, Agent, or Firm* — Brinks Gilson & Lione

(57) ABSTRACT

Described herein is a system that can link multiple electronic media production and/or publication applications. The linking of the multiple applications may be facilitated through a browser. Also, a toolbar included in the browser may facilitate the links between applications and assist a user in controlling one or more workflows that use the linked applications.

20 Claims, 18 Drawing Sheets

NAVIGATION BRIDGE

BACKGROUND

1. Field

Example embodiments relate to organization of software applications, and linking of software applications using an interface, such as a web browser.

2. Description of the Related Art

Individuals and organizations, such as advertisement producers and publishers, may use different software applications to produce and publish advertisements. Also, different roles within an organization may use different sets of applications to complete work.

SUMMARY

Described herein is a system for effectively linking multiple electronic media production and/or publication applications. The linking of the multiple applications may be facilitated through a browser, such as a web browser. Also, a toolbar included in the browser may facilitate the links between the applications and assist a user in controlling one or more workflows that use the applications.

The system may include an electronic device that includes a processor and a memory device. The memory device may include instructions executable by the processor. The instructions when executed by the processor may be operable to transmit to a display device, graphical information that includes data that represents a first and/or a second application interface in a browser, where the first and/or the second application interface may be part of a first workflow. The instructions are operable to transmit to the display device, graphical information that includes data that represents a first toolbar. The first toolbar may be displayed adjacent to the first and/or the second application interface, and the first toolbar may include one or more icons representing the first workflow. The instructions are operable to transmit to the display device, graphical information that includes data that represents a third application interface in the browser, for example, where the third application interface is part of a second workflow, and where a second toolbar includes one or more icons representing the second workflow.

BRIEF DESCRIPTION OF THE DRAWINGS

The system may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION OF EXAMPLE EMBODIMENTS

Figure 1:
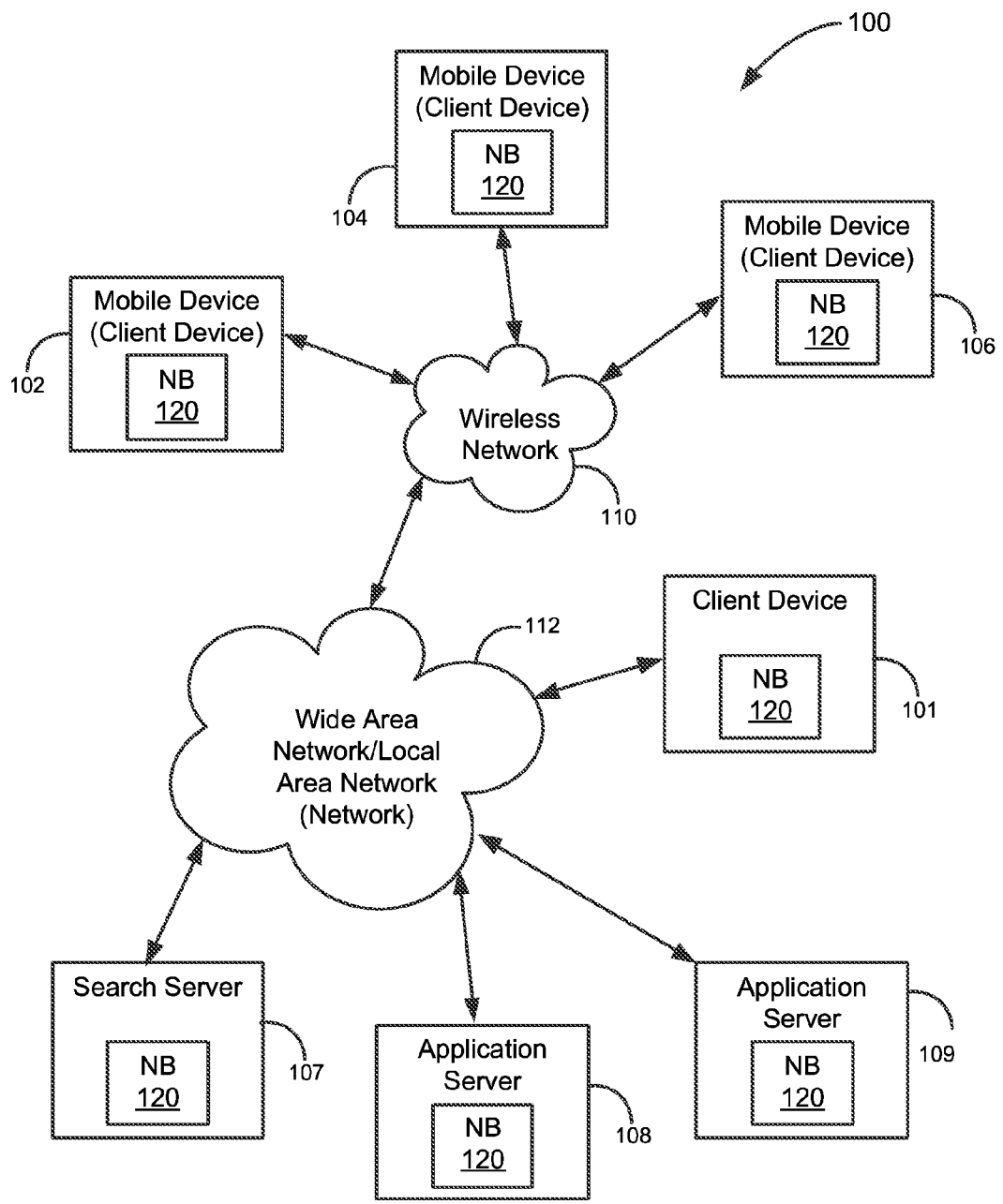
FIG. 1 illustrates a block diagram of one embodiment of a network that can implement one or more aspects of one embodiment of a navigation bridge.

Organizations, such as advertisement producers and publishers, use different software applications to produce and/or publish electronic advertisements. Further, different roles within an organization, such as creative staff and sales personnel, may use different sets of applications to complete their work. Because of variation in workflow between roles and organizations, productivity, accuracy, and user experience issues may arise in production and publication of electronic media such as electronic advertisements. Such issues may include difficulties in switching between software applications, for example.

A system, such as a navigation bridge, can link multiple electronic media production and/or publication applications. The system may link multiple electronic advertisement production and/or publication applications. The linking of the multiple applications may be facilitated through a browser, such as a web browser. Also, a toolbar that may include one or more menus may be included in the web browser. Such a toolbar may facilitate the aforementioned links between applications and assist a user in controlling one or more workflows that use the linked applications.

The navigation bridge is described with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

The terminology used in the specification is for describing particular embodiments only and is not intended to be limiting of example embodiments of the invention. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Likewise, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof, and in the following description, the same reference numerals denote the same elements.

Now, in order to more specifically describe example embodiments of the present invention, various embodiments of the present invention will be described in detail with reference to the attached drawings. However, the present invention is not limited to the example embodiments, but may be embodied in various forms. In addition, the detailed discussion is not intended as an extensive or detailed discussion of known concepts. As such, details that are known generally to those of ordinary skill in the relevant art may have been omitted or may be handled in summary fashion.

While example embodiments are shown and described with reference to the Figures, it will be understood by one of ordinary skill in the art that various changes in form and details may be made therein without departing from the spirit and scope of example embodiments, as defined by the following claims.

FIG. 1 illustrates a block diagram of one embodiment of a network 100 that can implement the navigation bridge. In FIG. 1, for example, a network 100 may include a variety of networks, such as a local area network (LAN)/wide area network (WAN) 112 and a wireless network 110, a variety of devices, such as client device 101 and mobile devices 102-106, and a variety of servers, such as application servers 108 and 109 (which may be advertisement software servers) and search server 107. One or more of these devices or services may include one or more hardware or software aspects of the navigation bridge (NB) 120.

A network, such as the network 100, may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network, such as wireless network 110, may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, Transmission Control Protocol/Internet Protocol (TCP/IP), User Datagram Protocol (UDP), or the like. Versions of the Internet Protocol (IP) may include IP version 4 (IPv4) or version 6 (IPv6).

The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Figure 2:
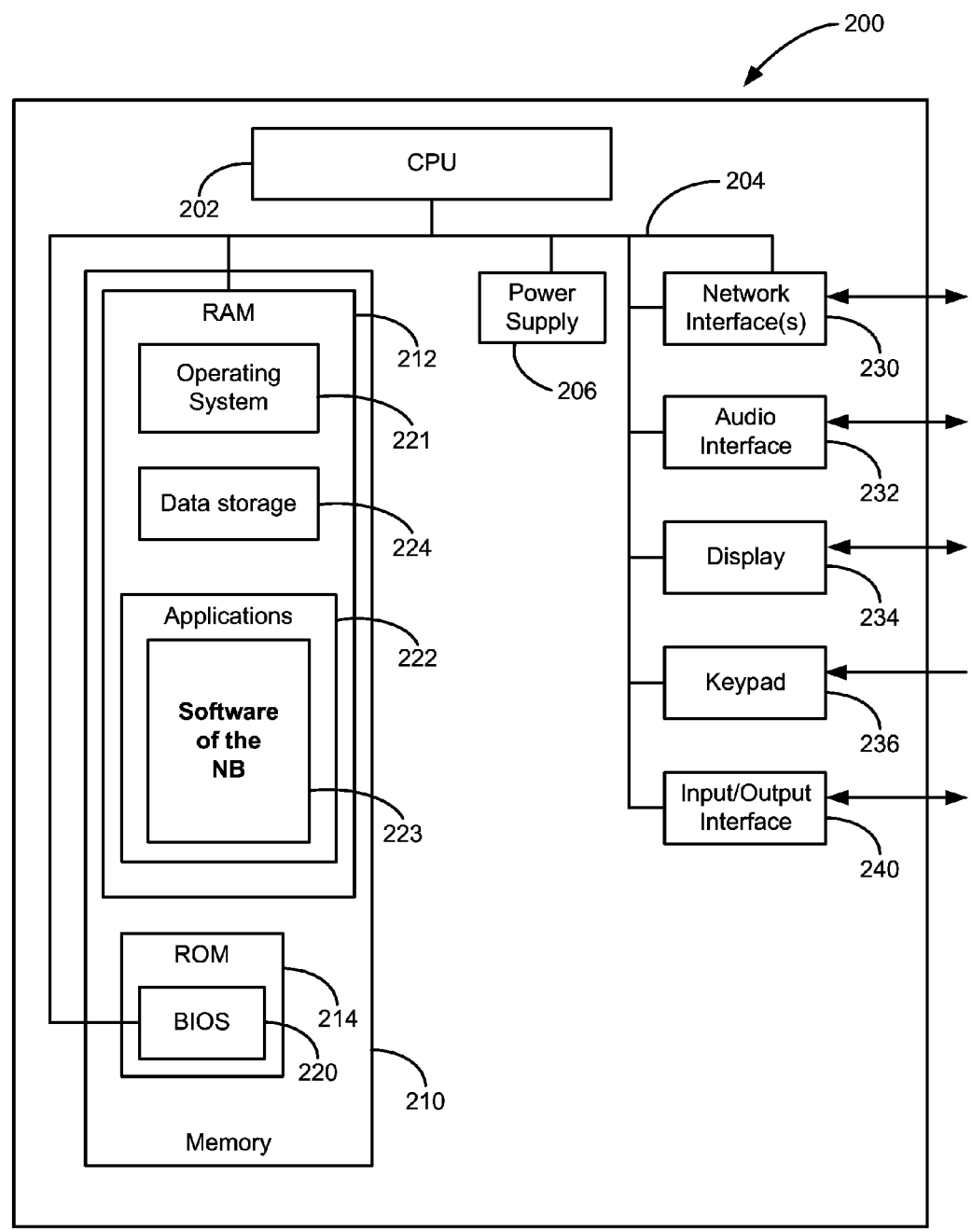
FIG. 2 illustrates a block diagram of one embodiment of an electronic device that can implement one or more aspects of one embodiment of a navigation bridge.

FIG. 2 illustrates a block diagram of one embodiment of an electronic device 200 that can implement one or more aspects of one embodiment of the navigation bridge. Instances of the electronic device 200 may include servers, such as servers 107-109, and client devices, such as client devices 101-106. A client device may be a desktop computer, a laptop computer, a tablet, or a smartphone, for example. In general, the electronic device 200 can include a processor 202, memory 210, a power supply 206, and input/output components, such as network interface(s) 230, an audio interface 232, a display 234, a key pad or keyboard 236, an input/output interface 240, and a communication bus 204 that connects the aforementioned elements of the electronic device. The network interfaces 230 can include a receiver and a transmitter (or a transceiver), and an antenna for wireless communications.

The processor 202 can be one or more of any type of processing device, such as a central processing unit (CPU). Also, for example, the processor 202 can be central processing logic; central processing logic includes hardware, firmware, software and/or combinations of each to perform a function(s) or an action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software. The memory 210, which can include RAM 212 or ROM 214, can be enabled by one or more of any type of memory device, such as a primary (directly accessible by the CPU) and/or a secondary (indirectly accessible by the CPU) storage device (e.g., flash memory, magnetic disk, optical disk). The RAM can include an operating system 221, data storage 224, and applications 222, such as a software aspect of the navigation bridge (NB) 223. The ROM can include BIOS 220 of the electronic device 200. The power supply 206 contains one or more power components, and facilitates supply and management of power to the electronic device 200.

The input/output components can include any interfaces for facilitating communication between any components of the electronic device 200, components of external devices (such as components of other devices of the network 100), and end users. For example, such components can include a network card that is an integration of a receiver, a transmitter, and one or more I/O interfaces. A network card, for example, can facilitate wired or wireless communication with other devices of a network. In cases of wireless communication, an antenna can facilitate such communication. Also, the I/O interfaces, can include user interfaces such as monitors, keyboards, touchscreens, microphones, and speakers. Further, some of the I/O interfaces and the bus 204 can facilitate communication between components of the electronic device 200, and in one embodiment can ease processing performed by the processor 202.

Where the electronic device 200 is a client device, it can include a computing device capable of sending or receiving signals, such as via a wired or a wireless network. A client device may, for example, include a desktop computer or a portable device, such as a cellular phone telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Also, a client device may vary in terms of capabilities or features. Claimed subject matter is intended to cover a wide range of potential variations. For example, a cell phone embodiment may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch sensitive color 2D or 3D display, for example.

Further, a client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages regarding operation or configuration of the navigation bridge. A client device may also include or execute an application to communicate content related to the navigation bridge, such as, for example, textual content, multimedia content, or the like. A client device may also include or execute an application to perform a variety of possible tasks, such as browsing, searching, or analyzing forms of content related to the navigation bridge.

Where the electronic device 200 is a server, it can include a computing device that is capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Further, a server may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. Particularly, the server may be an application server that includes a configuration to provide an application, such as one embodiment of the navigation bridge, via a network to another device. Also, an application server may, for example, host a website that can provide a user interface for one embodiment of the navigation bridge.

Further, an application server may provide a variety of services that include web services, third-party services, audio services, video services, email services, instant messaging (IM) services, short message service (SMS) services, multimedia messaging service (MMS) services, file transfer protocol (FTP) services, voice over IP (VOIP) services, calendaring services, photo services, or the like, all of which may work in conjunction with the navigation bridge. Examples of content provide by the abovementioned applications, including one embodiment of the navigation bridge, may include text, images, audio, video, or the like, which may be processed in the form of physical signals, such as electrical signals, for example, or may be stored in memory, as physical states, for example.

Figure 3:
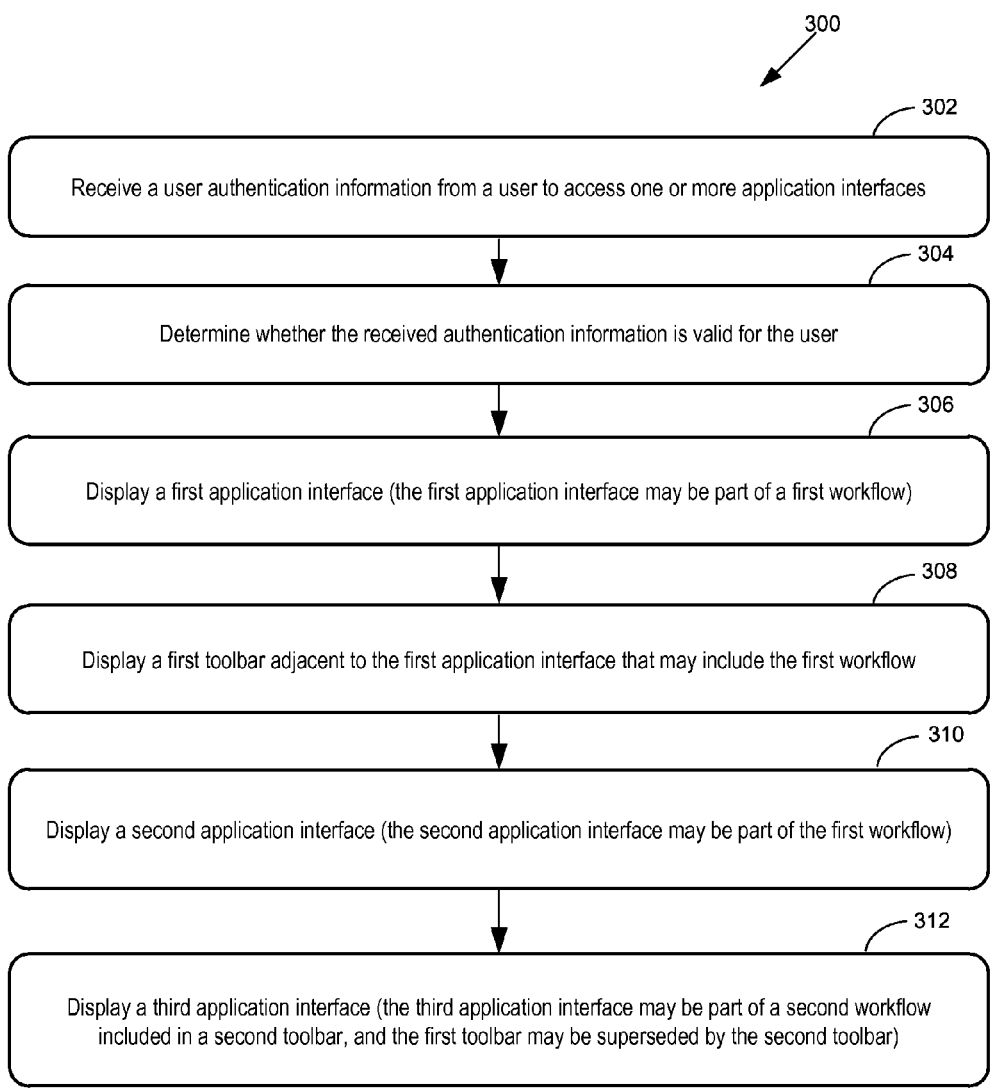
FIG. 3 illustrates a flowchart of an example method that can be performed by one or more aspects of one embodiment of a navigation bridge.

FIG. 3 illustrates a flowchart 300 of an example method that can be performed by one or more aspects of one embodiment of a navigation bridge, such as the electronic device 200. At block 302, the navigation bridge receives user authentication information from a user to access one or more application interfaces of the navigation bridge; and determines whether the received authentication information is valid for the user (at 304). One or more aspects display a first application interface (such as application interface 610 of FIG. 6) of the navigation bridge, where the first application interface may be part of a first workflow (at 306). The one or more aspects may also display a first toolbar adjacent to the first application interface that may include the first workflow (at 308). Also, a second application interface (such as application interface 710 of FIG. 7) of the navigation bridge may be displayed in the browser, where the second application interface may also be part of the first workflow (at 310). One or more aspects displaying a third application interface (such as application interface 1810 of FIG. 18) of the navigation bridge, where the third application interface may be part of a second workflow included in a second toolbar, and where the first toolbar may be superseded by the second toolbar (at 312).

In one embodiment, a processor (e.g., the processor 202) can perform the method of flowchart 300 by executing processing device readable and/or executable instructions encoded in memory (e.g., the memory 210). In such an embodiment, the instructions encoded in memory may include a software aspect of the navigation bridge, such as the software aspect 223.

A user authentication aspect of an electronic device may receive user authentication information from a user, such as a username and password, to access one or more application interfaces of the navigation bridge (at 302). For example, a browser of the navigation bridge may display various graphical aspects of the navigation bridge, such a graphical embodiment of the user authentication aspect in FIGS. 4 and 5.

At 304, the authentication aspect may determine whether the received authentication information is valid for the user. At 306, upon the determination that the authentication information is valid, the method of flowchart 300 may continue with a first processing aspect of the electronic device executing instructions to display a first application interface of the navigation bridge in the browser (such as application interface 610 of FIG. 6). The first application interface may be part of a first workflow, such as an advertising production and/or publication workflow, and may be linked to a first application, such as an advertising production and/or publication application. Also, the first application interface or any application interface described herein may be an interface to an object of one or more applications or workflows (such as an advertisement project object).

In one embodiment, this displaying of the first application interface may occur subsequent to the navigation bridge authenticating the user at step 302. Also, a browser displaying the one or more application interfaces, such as the first application interface, may include a header section (such as header section 612 of FIG. 6) that displays one or more executable icons (such as icons 601-604 of FIG. 6). One of these executable icons may include a link to a respective application interface, for example. The link may link to interfaces of a workflow (such as workflow 616 of FIG. 6) or an object of a workflow and/or an application. Further, one or more of the executable icons may be highlighted (such as highlighted icon 601 of FIG. 6) to represent an active interface, object, application, or workflow.

Figure 6:
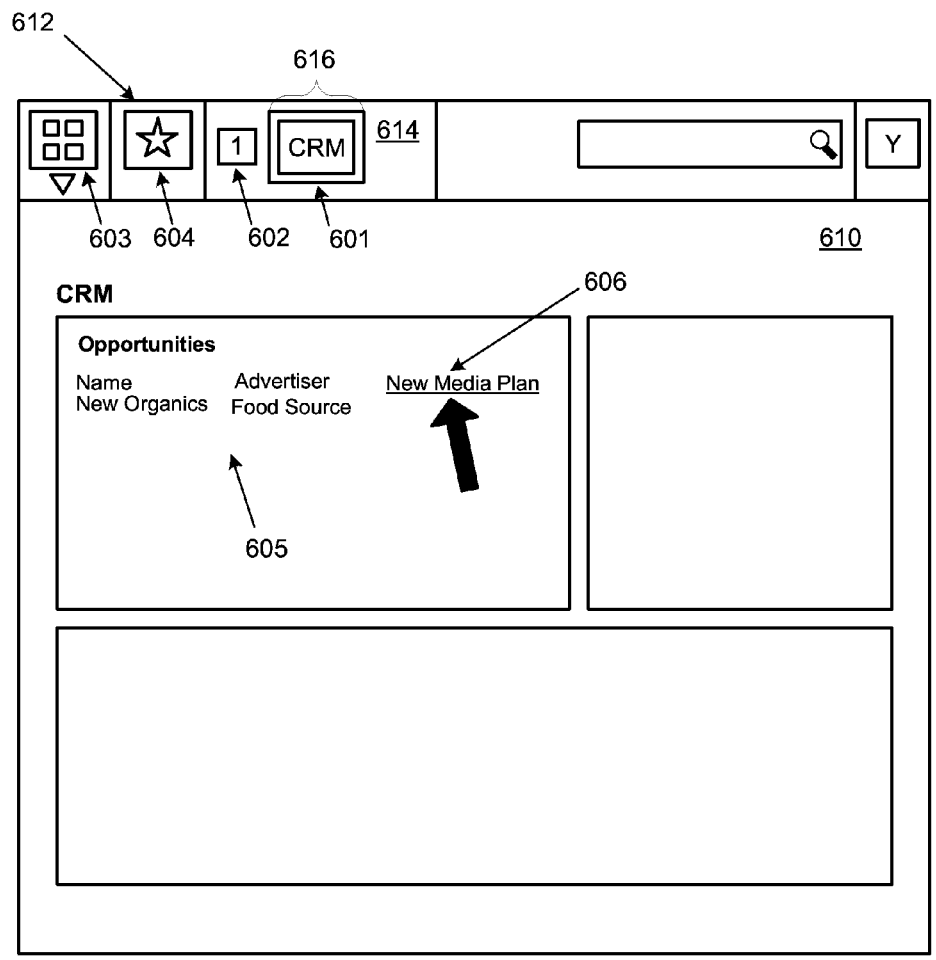
FIGS. 6-18 illustrate of other example aspects of the navigation bridge of FIGS. 4 and 5, which include example application interfaces of the navigation bridge.

At 308, for example, a second processing aspect of the electronic device may execute instructions to display a first toolbar (such as toolbar 614 of FIG. 6, and labeled "Food Source" in FIG. 7) adjacent to the first application interface. In one embodiment, the first toolbar may be displayed in a browser above and/or abutting the first application interface. Further, this first toolbar may include the first workflow. FIG. 6 depicts a first application interface (such as interface 610), a first workflow (such as workflow 616), and a first toolbar (such as toolbar 614), for example.

Figure 7:
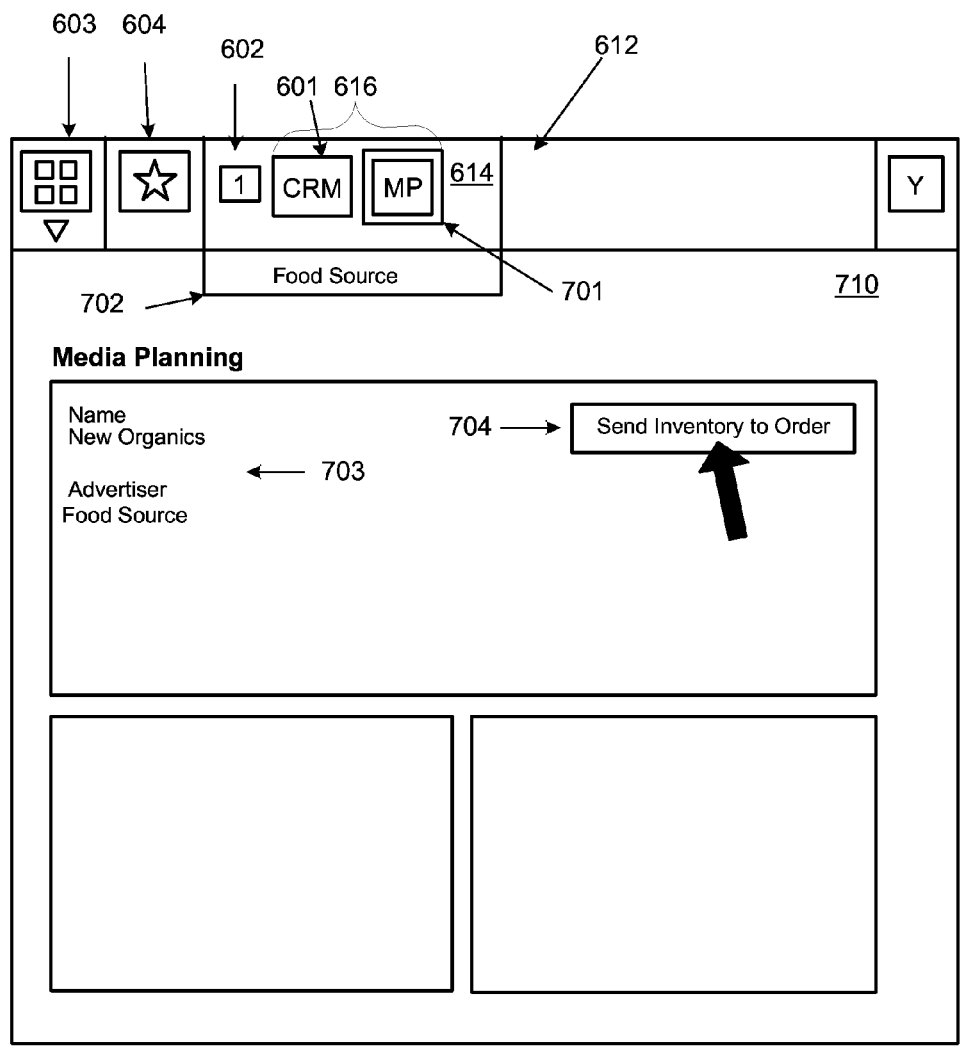

At 310, the method of flowchart 300 may continue with a third processing aspect of the electronic device executing instructions to display a second application interface (such as application interface 710 of FIG. 7) of the navigation bridge in the browser, where the second application interface may also be part of the first workflow. Respectively, the first workflow may also include first and second icons (such as icons 601 and 701 of FIG. 7) that link to the first and the second application interfaces. The execution of instructions at step 310 may occur as a result of a user selecting a link (such as link 606 of FIG. 6) in the first application interface that directs the browser to the second application interface. Also, the navigation may occur due to execution of a link in the first toolbar (such as link button 701 of FIG. 8) that directs the browser to the second application interface. Further, in navigation from one application interface to another application interface, information gathered in the one application interface may be utilized by the other application interface, and/or vice versa (see text 605 and 703 of FIGS. 6 and 7, respectively). FIG. 7 depicts a second application interface (interface 710), a first workflow (workflow 616), and a first toolbar (toolbar 614). In FIG. 7, respective icons 601 and 701 linked to the interfaces are in an order in which the interfaces were activated.

At 312, the method of flowchart 300 may continue with a fourth processing aspect of the electronic device executing instructions to display a third application interface (such as application interface 1810 of FIG. 18) of the navigation bridge. For example, in FIG. 18, an example browser of the navigation bridge displays an interface for an analytics type application. The third application interface may be part of a second workflow (such as workflow "2" 1816 of FIG. 18) included in a second toolbar (such as toolbar 1812 of FIG. 18, labeled "Bart Colors"), and the first toolbar may be superseded by the second toolbar (also shown in FIG. 18).

Figure 18:
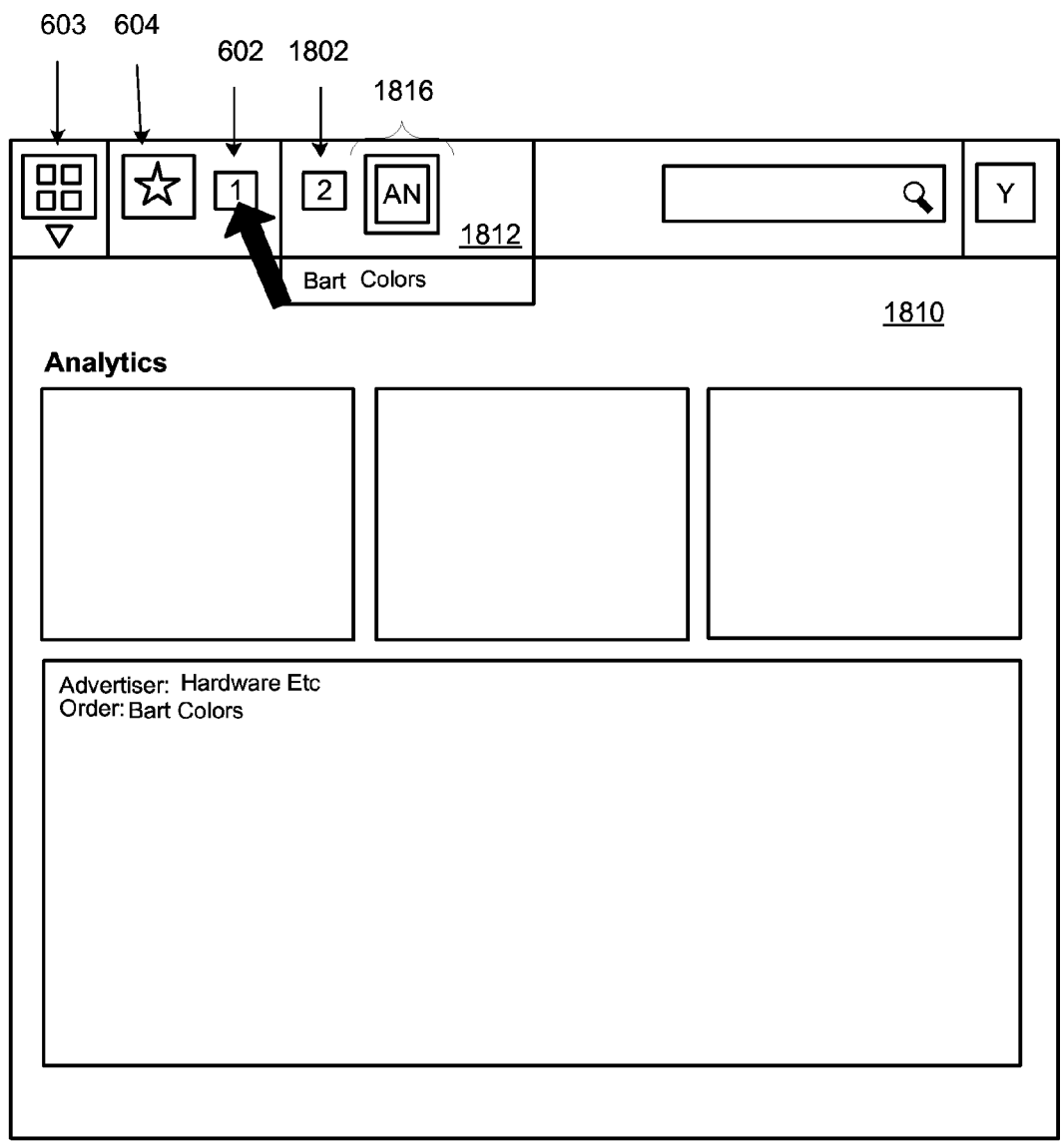

In one embodiment, the second toolbar may supersede the first toolbar by overlapping it. Also, the browser may include a header that includes the first and the second toolbar. In such an arrangement, a user may expand and collapse the first and second toolbars in the header manually, or this may happen automatically when one of the workflows comes to the forefront of the browser. In FIG. 18, the user is selecting icon 602 that may be operable to expand a first toolbar (such toolbar 614 of FIG. 6).

With respect to the interfaces of this method, for example, the first, second, and third application interfaces may be interfaces related to the same application. Further, the first through fourth processing aspects may be the same processing device. Also, the second workflow may be a sub-workflow of the first workflow, or vice versa; and the second toolbar may a sub-toolbar of the first toolbar, or vice versa. Furthermore, any toolbar, header, menu, or the like described herein may include one or more expandable sub-toolbar or menu, such as a favorites menu, application interface log, or the like.

Regarding the operations of method of flowchart 300 or any analogous operations, FIGS. 4-18 depict graphical user interfaces (GUIs), such as GUIs within a web browser, that can facilitate one or more of these operations.

Figure 4:
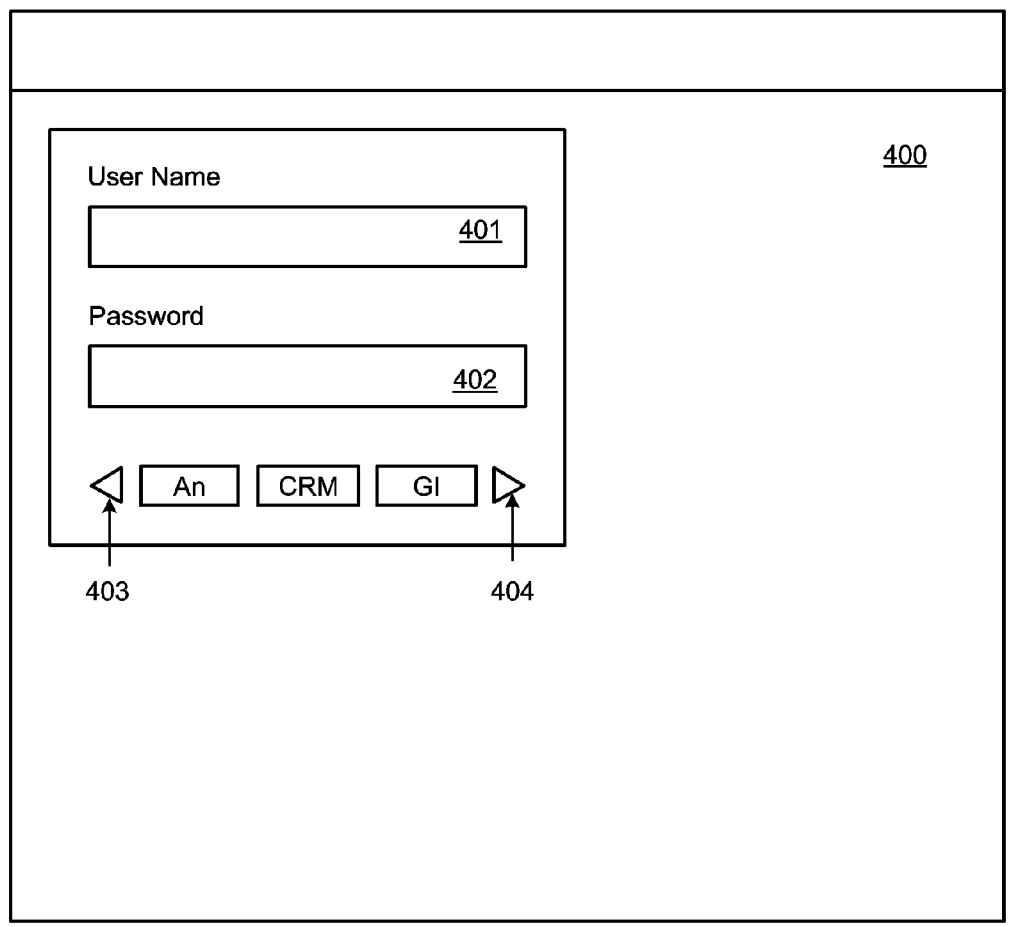
FIG. 4 illustrates an example aspect of one embodiment of a navigation bridge that includes an example user authentication screen.
Figure 5:
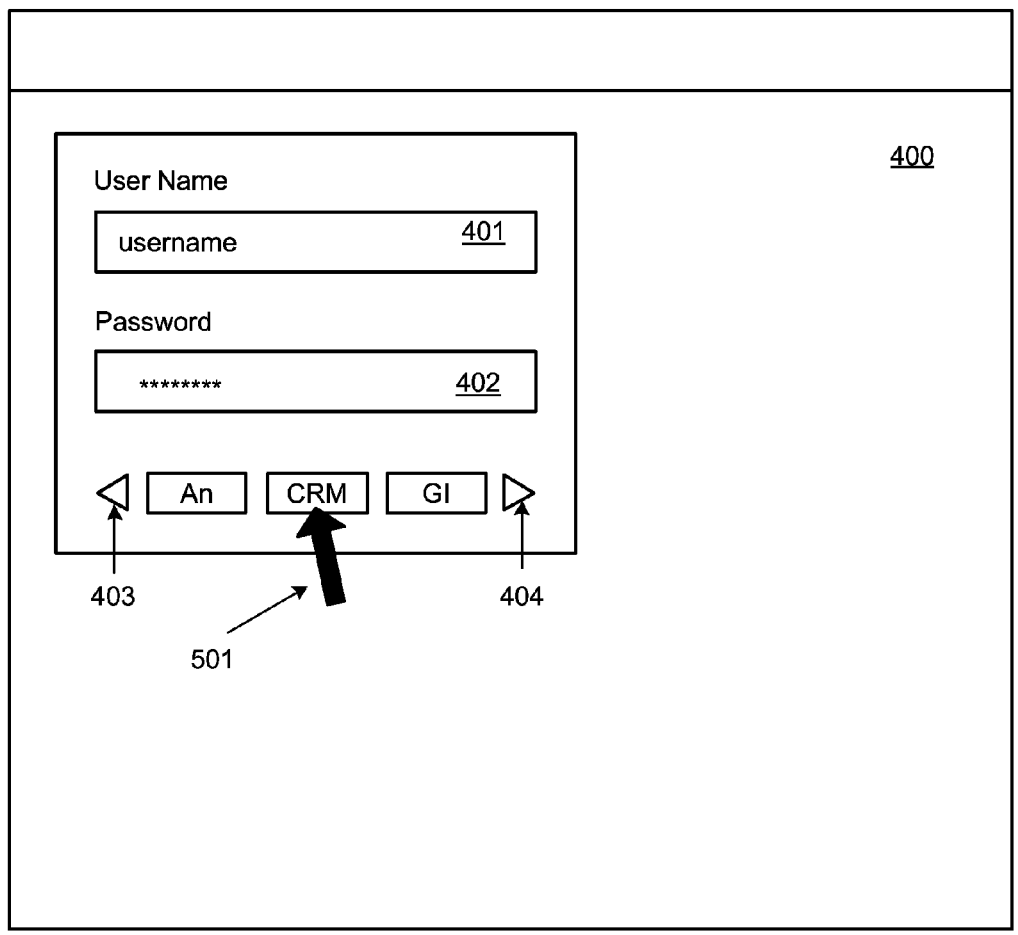
FIG. 5 illustrates another view of the aspect of FIG. 4.

In FIGS. 4 and 5, an example user authentication screen 400 displays data field "User Name" 401 and data field "Password" 402 and executable icons such as icons "AN", "CRM", and "GI", which are operable to initiate respective application interfaces (Analytics, Customer Relation Management, and Guaranteed Inventory Order booking) upon authentication.

In such a GUI, a user may be presented a single sign-in interface for one or more applications of an advertisement production and/or publication workflow. At the single sign-in interface, a user may choose from various application interfaces of various production and/or publication software applications. For example, the user may choose from applications the user is permitted to access. A user may access an application interface for an application by selecting (such as selecting via mouse click) an executable icon associated with a desired application (such as icons "AN", "CRM", and "GI") and providing his or her authentication information (such as a username and a password). For example, in FIG. 5, a username "username" and a hidden password "********" have been entered. Also shown, the user is selecting the "CRM" icon using pointer 501. In this example, selecting the "CRM" icon may result in execution of a customer relationship management (CRM) application and a respective interface of the navigation bridge. A CRM application interface of the navigation bridge may be executed to start a new project for an advertiser. Also, in FIGS. 4 and 5, two buttons 403 and 404 may be displayed to allow a user to scroll through executable icons that may be associated with other applications or objects of applications and/or workflows.

In FIG. 6, depicted is an example first application interface 610, a CRM application interface, displayed in a browser such as a web browser. At the top of the browser is toolbar 614 that includes link button 601 associated with the displayed CRM application interface. As depicted, link button 601 is highlighted since the CRM application interface is active.

Also, in FIG. 6, link button 602 represents a current workflow activated by the navigation bridge, workflow "1" 616. In scenarios where there are more than one link button to various workflows (such as workflow "1" 616), by clicking on one of such buttons, a user can open another toolbar including another workflow (such as workflow "2" 1816 of FIG. 18) that includes one or more analogous executable icons. Also, when one workflow toolbar opens the others may close. This allows a user to use more than one workflow and to quickly jump back into tasks within a previous workflow. It also reduces the number of link buttons cluttering a toolbar.

Also, in FIG. 6, displayed is link button 603 that may be operable when selected to list stored workflows (such as workflows for other advertisers that are not currently open or loaded to a memory device of the navigation bridge). Further, link button 604, shown at least in FIG. 6, represents a link to commonly used or preferred applications or objects, application or object interfaces, and/or workflows. For example, there are times when a user's agenda contains tasks that are not included in an opened workflow. In such an example, a user may select one or more additional applications, interfaces, or objects (such as inventory from another application) from a menu that results from a user clicking on a link button, like link button 604. Such a menu may be a favorites menu.

Furthermore, a menu of commonly or preferably used applications may be pre-set for each user role and can be customized for a specific user and/or a specific project (like a predetermined favorites menu by role). For example, a sales person might book inventory through a displayed inventory ad exchange system while another might book inventory from a guaranteed inventory order system. Yet another sales person may book search inventory as well as other types of inventory from the inventory ad exchange system. Example inventory may include guaranteed display inventory, ad exchange display non-guaranteed inventory, search inventory, and the like. Guaranteed display inventory is purchased at a set price and an advertiser is guaranteed that ads will be served to a specific number of users alongside digital content. Ad exchange display non-guaranteed inventory is purchased through a bidding model where the ads from the highest bidder are displayed alongside digital content. Search inventory (purchased through bidding) are ads that display with a search results page (such as sponsored search results). The aforementioned types of inventory are common examples, but there are variations on these examples and many different applications used to book these different types of inventory.

Further, the navigation bridge may administer permissions for linking across applications of such systems. Also, a session menu or workflow menu of a toolbar may close when a favorites menu opens (See FIGS. 11 and 12), and vice versa.

These menus and other menus described herein may be associated to a specific toolbar, such as a first toolbar or a second toolbar. Alternatively, one or more menus may be universal to toolbars of the navigation bridge. For example, workflow or session menus may be associated with a respective toolbar; whereas a favorites menu may be a consistent component of a navigation bridge regardless of the presence of specific workflow toolbars.

Also, in FIG. 6, depicted is listing of advertising project 605, titled "New Organics", which was created in the CRM application via one or more CRM application interfaces of the navigation bridge, for example. Advertising project listing 605 includes a name of the project and a name of a respective advertiser. Also shown in FIG. 6, included with the listing of the project is link 606, that may be operable when selected to create a media plan by sending project data (such as the name of the project, the name of the advertiser, budget of the project, and the like) to a media planning application. This link operates to automatically execute a media planning application and create a media plan for a project in one click, for example. This link also operates to automatically sign in the user to the application, using the authentication information such as the information entered into the GUI of FIGS. 4 and 5.

Figure 8:
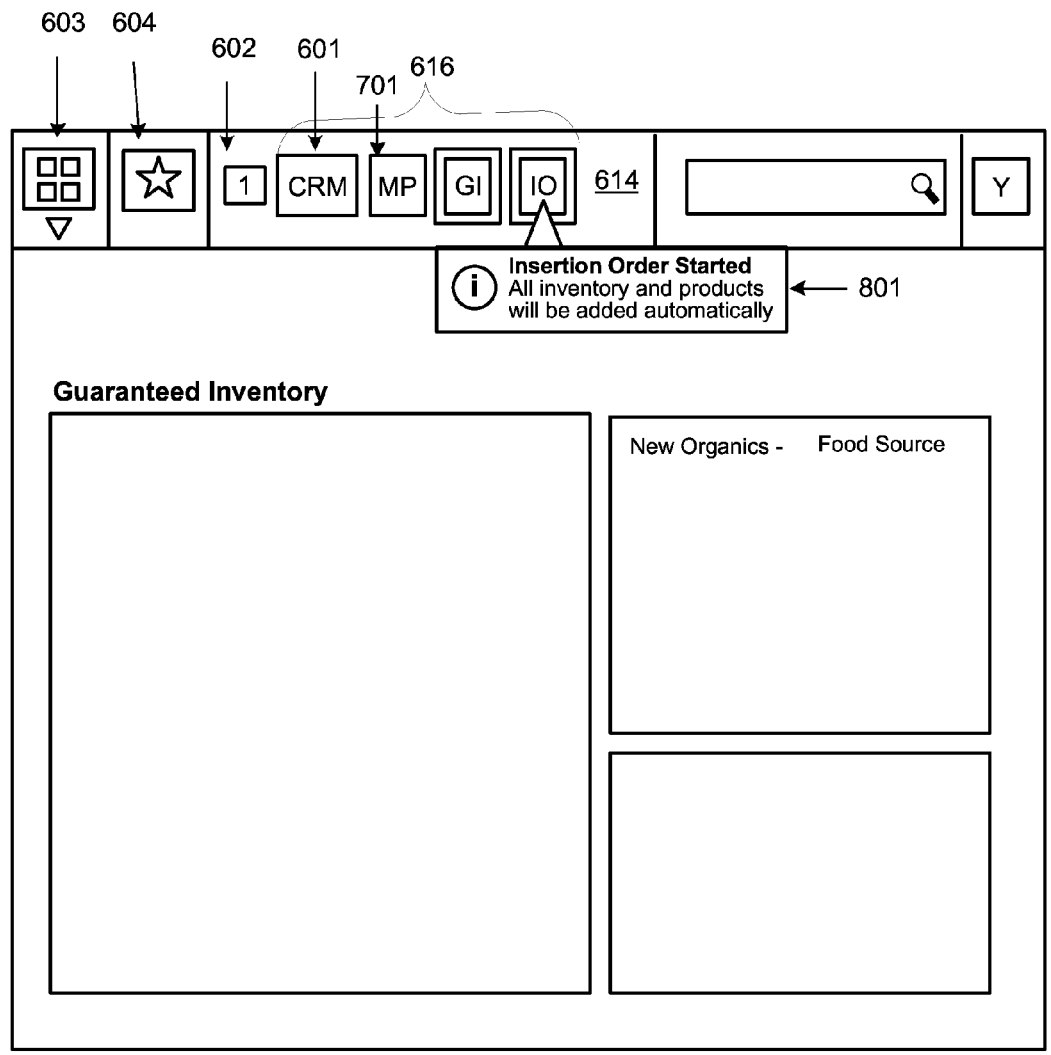

In FIG. 7, depicted is an example second application interface, an interface to a media planning application, which may have resulted from a user selecting link 606 in FIG. 6 (in FIG. 6, a user selects link 606 using a pointer). Also, for example, in FIG. 8, depicted is a GUI for a guaranteed inventory order system, which may have resulted from a user selecting link button 704 in the media planning application interface of FIG. 7. In FIG. 7, a user selects link button 704 using a pointer.

Also depicted in FIG. 7, is highlighted button 701 associated with the media planning application. Also shown, is text 702 that notifies a user of a present session of the navigation bridge. The text 702, may include information related to the session such as one or more advertisers associated with the session. The information related to the session may also include a name of an object created or selected in a workflow created in the session, such as an advertiser's or a project's name. Also, depicted is toolbar 614 representing a session and/or a workflow (such as workflow 616). Toolbar 614 includes buttons 601-604 along with highlighted button 701. Also depicted, buttons 601 and 701 are listed in an order in which a user opened their respective application interfaces. In other examples, one or more link buttons to respective applications, interfaces, or objects can be displayed in another order, such as the order in which the applications we last used in a workflow. Also, workflows or icons representing workflows can be displayed in such orders. Further, in the application interface of the media planning application, included is information used from a prior application in a workflow, such as the CRM application (See text 703). The information being created or managed during the workflow is associated back to a customer master file (the advertiser master record).

Also depicted in FIG. 7 is link button 704, which a user may select to navigate to another application interface. In the case of FIG. 7, depicted is the user selecting button 704 to send collected inventory information from the media planner application to the guaranteed inventory order system. This action may also open the guaranteed inventory order system, and a respective interface. Thus, a new connected task is started, and as depicted in FIG. 8, an interface for the guaranteed inventory order system is displayed.

Also depicted in FIG. 8, dialog box 801 has popped up from toolbar 614. Dialog box 801 may have popped up automatically or from a user clicking on or hovering over (with a pointer) an executable icon "IO", for example. Further depicted, a part of dialog box 801 is pointing towards the executable icon "IO" to represent that the box relates to an icon. Also, dialog box 801 may display when a respective interface, application, or object associated with the executable icon "IO" is running or opened, respectively.

Regarding a respective interface, application, or object, information displayed within such a dialog box may include notice of past operations, operations presently occurring, and/or a proceeding operation. Also, dialog box 801 or the like may receive the displayed information through a messaging service, such as SMS.

Furthermore, the navigation bridge can create an object of an application and render an associated button on the first toolbar, such as toolbar 614. In FIG. 8, for example, the object is an insertion order (or invoice) and it is associated with the button "IO". Since different applications have been shown in FIGS. 6-17 to book inventory, the object is linked through the navigation bridge to the different applications. Further, the navigation bridge may provide universal interfaces for various types of applications, so that such an object may be linked to various software products for each of the various types of applications.

Figure 9:
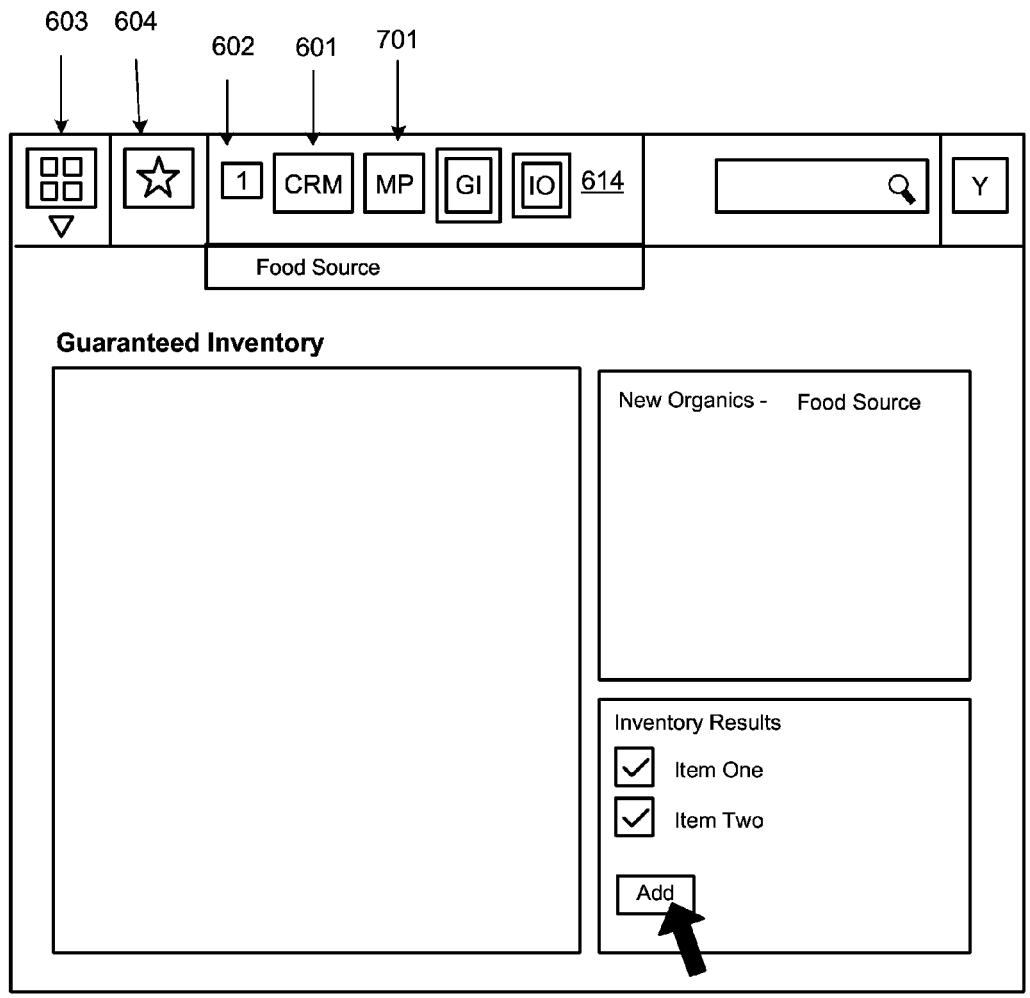

Referring back to executable icons of toolbar 614, in FIG. 9, buttons "GI" and "IO" are highlighted differently. Such variation in highlighting may represent that the icons are displaying different statuses of respective applications and/or objects associated with the icons. Such statuses may be associated with different states and/or positions in a workflow, application, or object. A button for a current application or object may be highlighted in a certain manner. While a button for a secondary or background application or object, which for example may be in the process of being updated with respect to the primarily application or object, may be displayed with a secondary level of emphasis. In other words, applications or objects that are not in the forefront (such as the forefront of the navigation bridge or a workflow), but are active or running due to being related to or dependent on an application or object in the forefront, may be emphasized in a user interface differently, such as to a lesser degree, than the application or object in the forefront.

Also, depicted in FIG. 9, continuing with the example GUIs presented in FIGS. 4-8, the user is adding inventory to an order from the guaranteed inventory order system by selecting items and then the "Add" button with a pointer. In some instances, for example, a user may add inventory from another source or application, such as an ad exchange.

Figure 10:
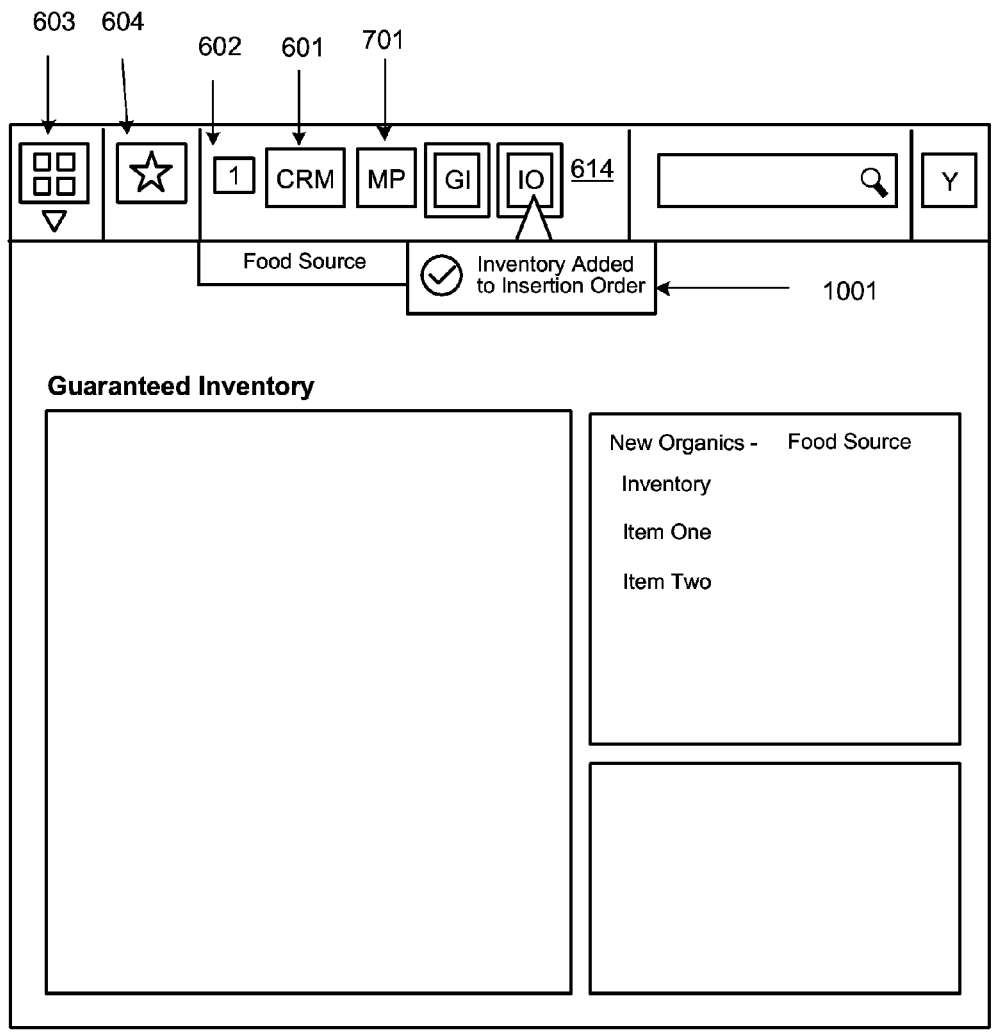

Shown in FIG. 10, notification of inventory being added to an insertion order is depicted (See text 1001). This is an example of a notification that may occur when objects interact across two or more applications and an update occurs that may be reflected in the two or more applications. A popup dialog box of a toolbar of the navigation bridge may notify a user of statuses of updates.

Figure 11:
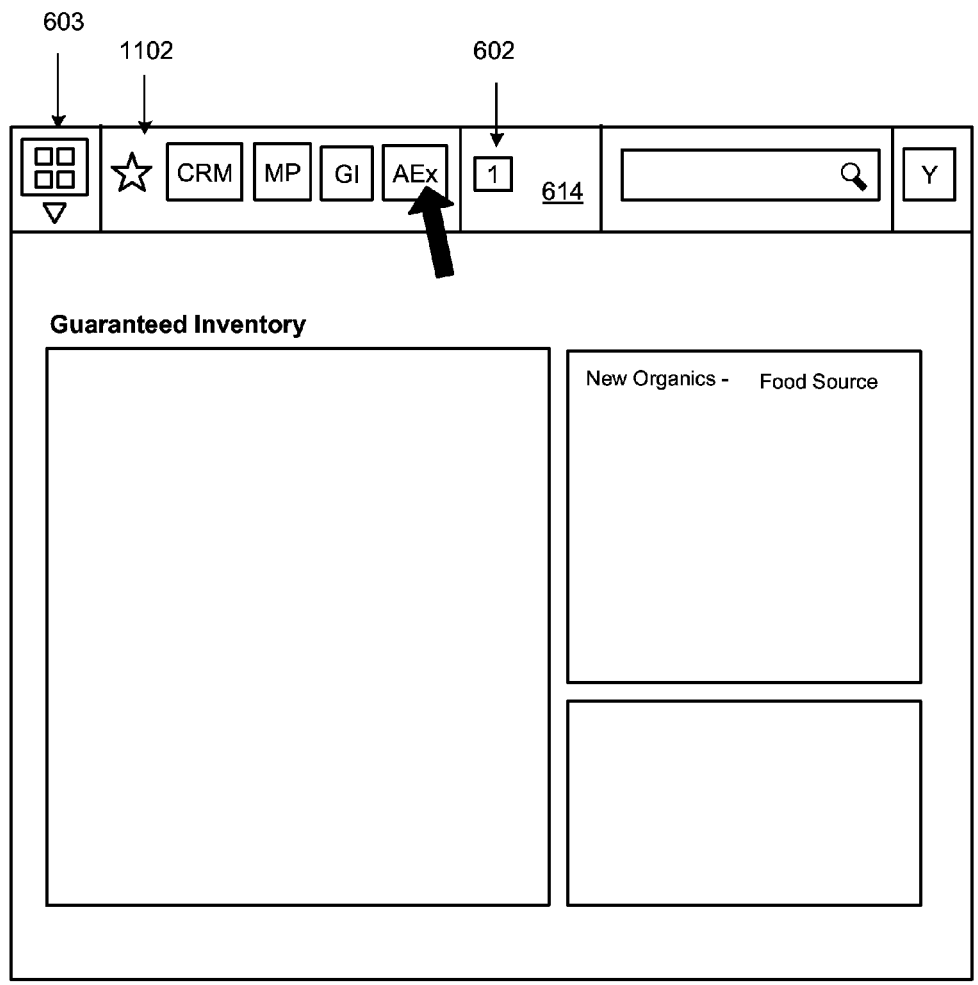

Similarly, in continuance of these examples, in FIG. 11, an ad exchange application interface may be accessed through the navigation bridge when an executable icon associated with the ad exchange system is displayed on toolbar 614 and a user selects that icon. This may allow the user to continue a workflow by starting a new task through the navigation bridge, instead of from an imbedded button in an application (see 704 in FIG. 7). In an example scenario, a user may want to add non-guaranteed inventory from the ad exchange system to the order, so the user may select the ad exchange application via the button "AEx". Also depicted in FIG. 11, menu 1102, which may be a favorites menu, contains the button "AEx". In this case, this menu may have opened from a user selecting link button 604 of FIG. 6.

Figure 12:
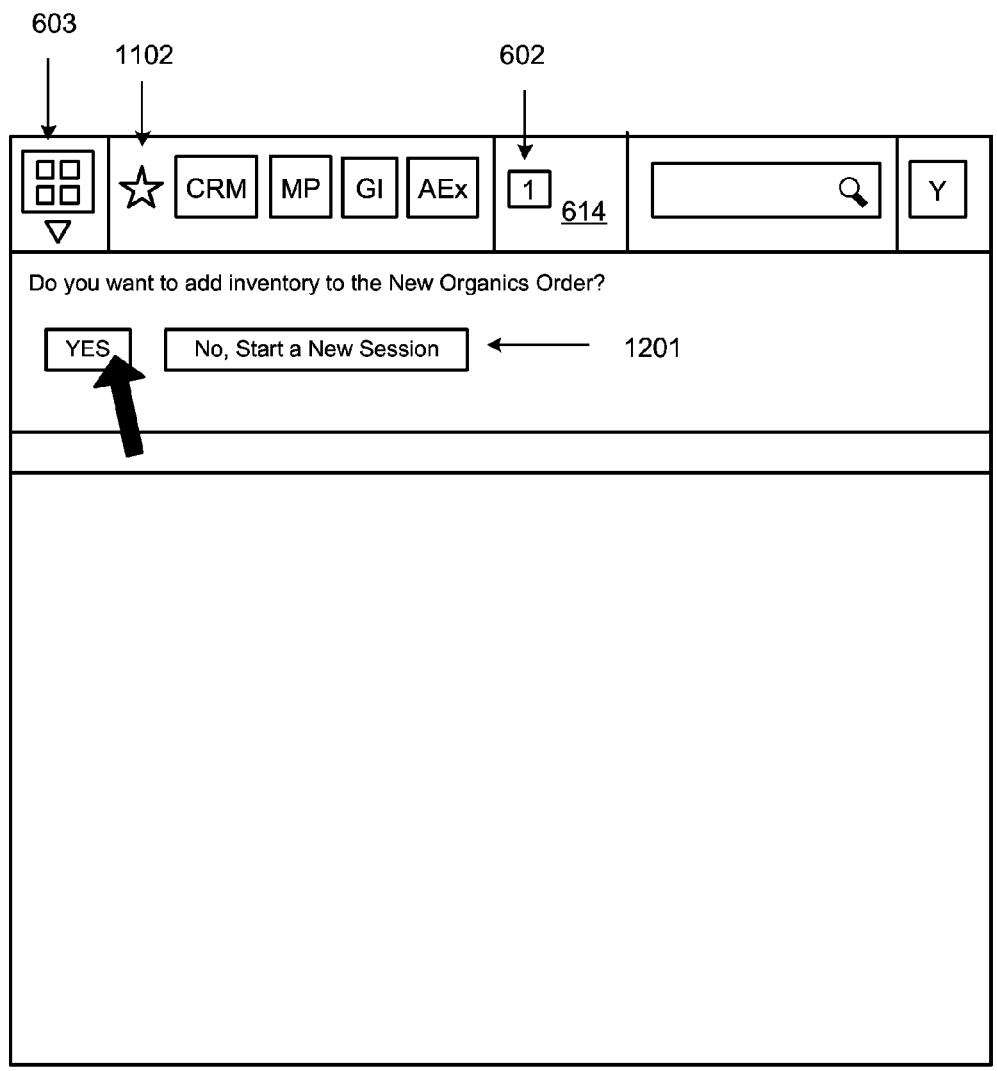

Depicted in FIG. 12, the navigation bridge automatically provides an option for the user to include the ad exchange application in the session workflow labeled "Food Source". This example option and the like may provide the user with an option to automatically link objects or records across applications when those objects or records have a relationship. Linked objects, for example, might be purchased ad slots across advertising channels that are billed through a single invoice. Or, for example, a single ad that runs across different ad servers may be represented by linked objects. When the user selects this option, the bridge may automatically push objects into the related application instead of requiring the user to reselect or identify (pull) the objects into the related application. Alternatively or in addition, through a dialog box, such as the one depicted, the user can also choose to start a new workflow (See text 1201), and may opt to not link the objects in the different applications.

Figure 13:
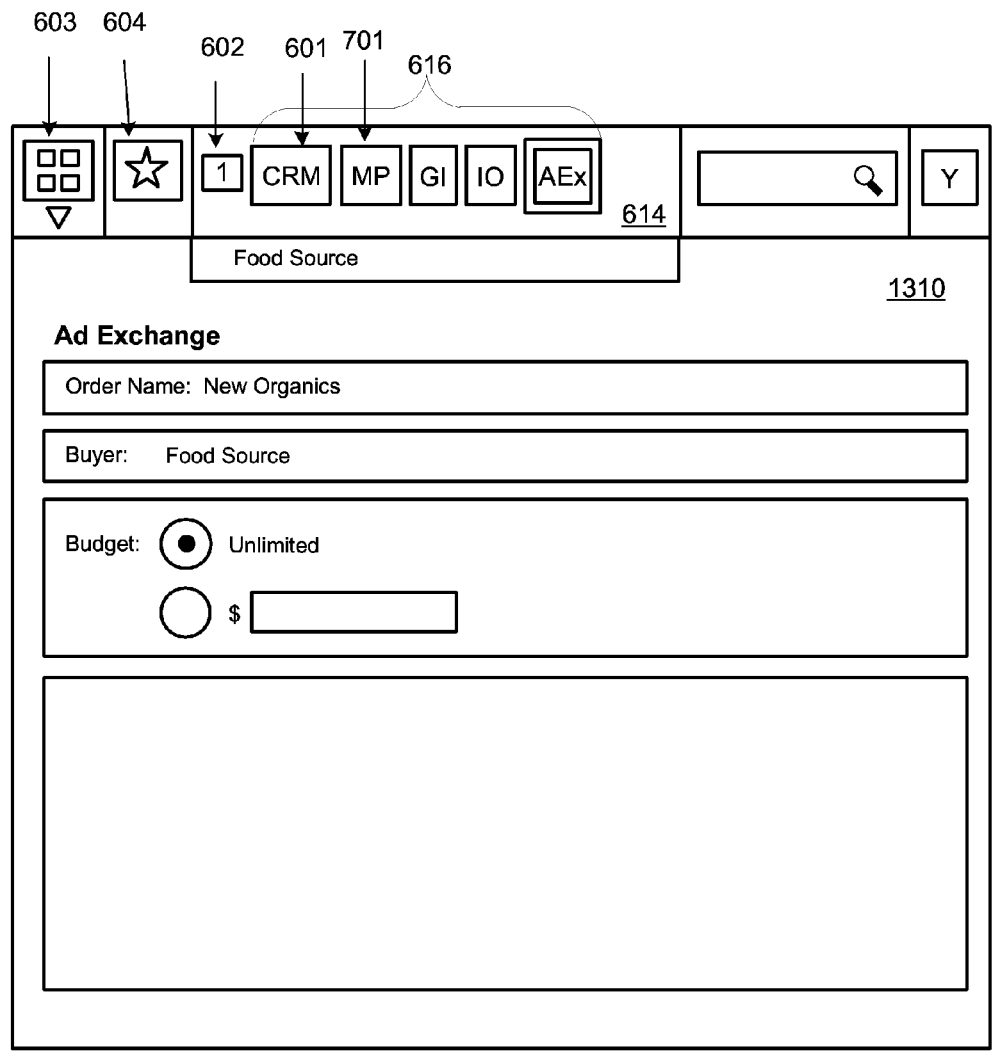

In FIG. 13, ad exchange application interface 1310 loads below and adjacent to toolbar 614. Also, its respective link button "AEx" loads on toolbar 614 and is highlighted. As mentioned, in one scenario, this application may have been executed from a favorites sub-menu. Also, such a sub-menu may have superseded a remainder of toolbar 614. Although, once an application is selected from the favorites sub-menu, the previous toolbar may reopen to the forefront. Further, in such an example, a toolbar may include a session menu, which shows objects and/or applications active, opened, and/or accessible in the present session of the navigation bridge. In this case, the session menu is labeled "Food Source". For the most part, in these examples, session menus display workflows, such as workflow 616.

Figure 14:
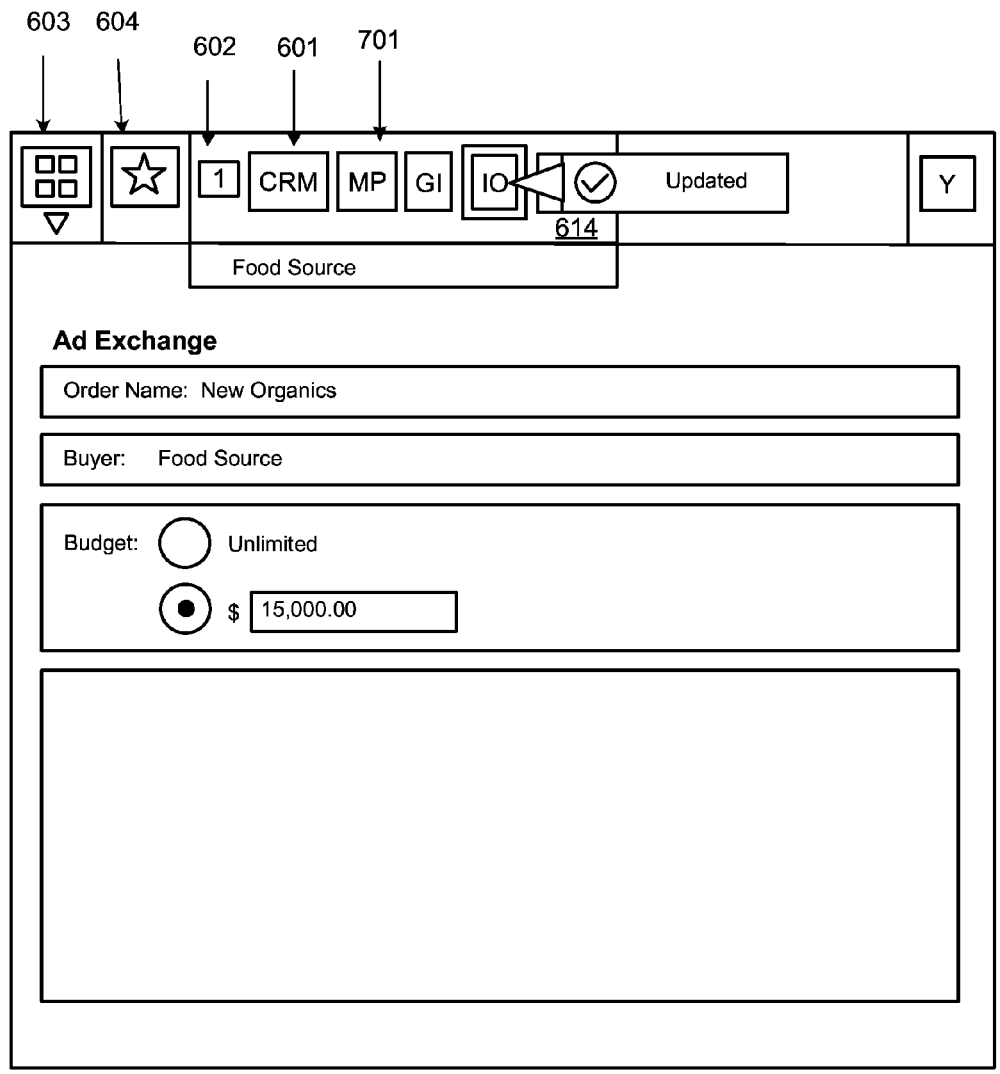

In FIG. 14, shown is another example of how the navigation bridge may notify the user of a status of a workflow, object, and/or an application process. For example, the user may be notified of status via a dialog box extending from one of the executable icons of a toolbar.

Figure 15:
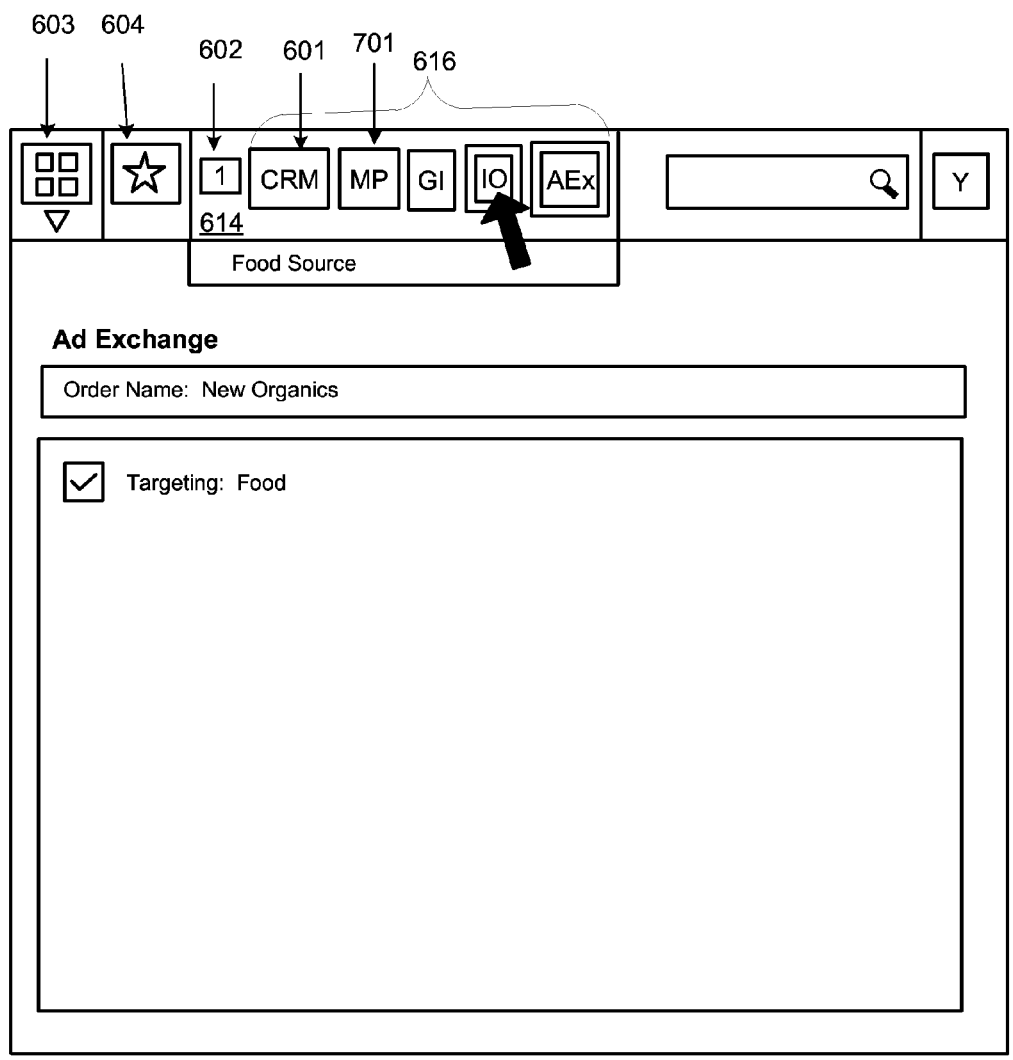

In these examples, once the user has completed an inventory task, the user may select the insertion order button "IO" to complete an order (see FIG. 15).

Figure 16:
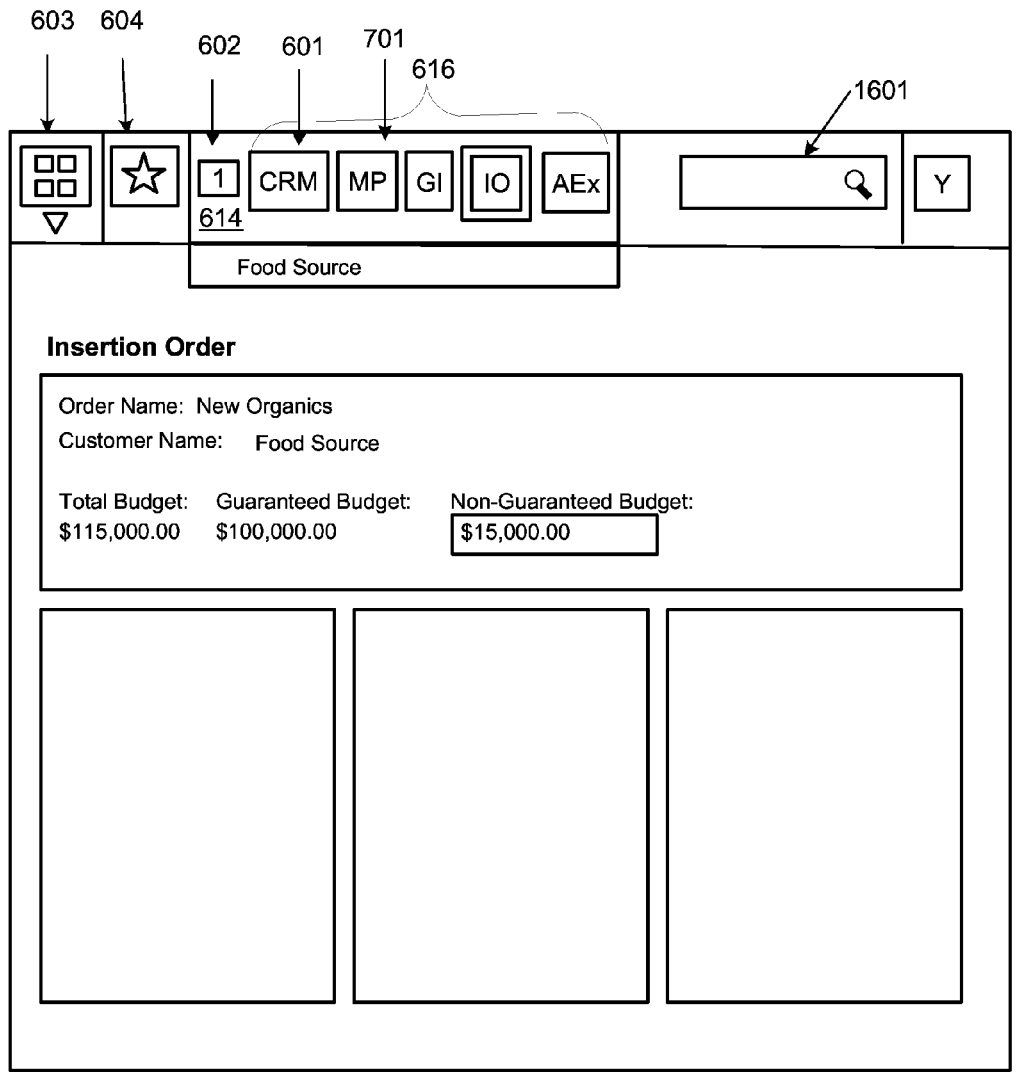

In FIG. 16, depicted is the insertion order displayed via an example insertion order interface of the navigation bridge. Also depicted, from this interface, a user may search for objects across applications for which the user has access permissions via a global (federated) search function, using search field 1601.

Figure 17:
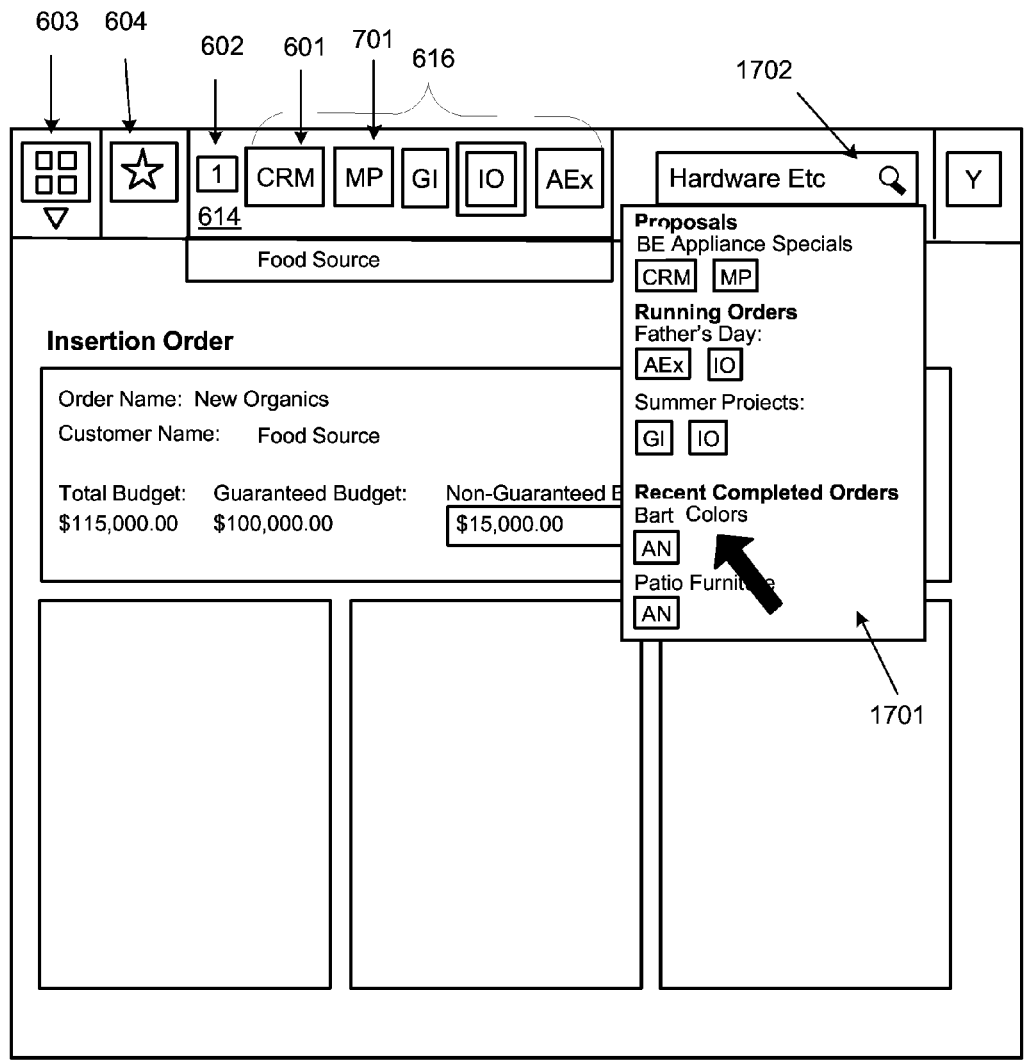

In FIG. 17, depicted, is a categorical list of objects or records 1701 extending from search field 1601. The objects or records may be rendered for example categorically by chronology and by application. These objects or records may render as the user enters text into the search field or subsequent to a user submitting search terms after clicking on adjacent search execution button 1702.

Also, since objects or records for a same order may exist in multiple applications, the navigation bridge allows the user to jump directly into one of the objects or records of an application. For example, from the categorical list the user may select an object or record from a period of time and from a particular application. In FIG. 17, the user is selecting an object or record from a list of recent completed orders, where the list is sorted by period of time and source of the object or record. Specifically, the user is selecting a report generated from an analytics application for a completed order titled "Bart Colors". Furthermore, by entering this analytics application the user in these examples has started a new workflow. The start of new workflow 1816 is shown in FIG. 18 by another workflow or session menu rendering at the top of the browser, while the menu for the first workflow has collapsed and is now represented by icon "1" 602. Also, in FIG. 18, a user is selecting icon "1" 602 with a pointer, which may cause the first workflow (such as workflow 616) to expand and the second workflow (such as workflow 1816) to collapse. Icon "2" may also be selected to expand and collapse the second workflow.

As it can be imagined, there are various embodiments for providing and deriving the methods and systems described herein. It is therefore intended that the foregoing detailed description be regarded as illustrative rather than limiting, and that it be understood that it is the following claims, including all equivalents, that are intended to define the spirit and scope of this invention.

We claim:

1. A method, comprising:
    displaying a first application interface of a first ad production application in a web browser, where the first application interface is part of a first step of a first ad production workflow;
    initially displaying a first toolbar in the browser adjacent to the first application interface, where the first toolbar includes a first icon representing the first step of the first workflow;
    displaying a second application interface of a second ad production application in the browser in a same position that the first application interface was displayed, where the second application interface is part of a second step of the first workflow;
    displaying in the first toolbar a second icon next to the first icon, the second icon representing the second step of the first workflow;
    displaying a third application interface of a third ad production application in the browser in a same position that the first and second application interfaces were displayed, where the third application interface is part of a first step of a second workflow; and
    displaying a second toolbar next to or instead of the first toolbar subsequent to the displaying of the first toolbar, the second toolbar including a third icon representing the first step of the second workflow.

2. The method of claim 1, comprising: receiving a user authentication information from a user to access one or more application interfaces, prior to the displaying a first application interface.

3. The method of claim 2, comprising: determining whether the received authentication information is valid for the user, prior to the displaying a first application interface.

4. The method of claim 1, where the first toolbar is operable to supersede the second toolbar, and the second toolbar is operable to supersede the first toolbar.

5. The method of claim 1, where the displaying a first toolbar in the browser adjacent to the first application interface includes displaying the first toolbar above and abutting the first application interface.

6. The method of claim 1, where the second workflow includes the first workflow or the first workflow includes the second workflow.

7. The method of claim 1, where the second toolbar includes the first toolbar or the first toolbar includes the second toolbar.

8. The method of claim 1, where the second application interface includes the first application interface or the first application interface includes the second application interface.

9. The method of claim 1, where the first and second toolbars include an expandable favorites menu, where the favorites menu includes preferred application interfaces.

10. The method of claim 1, where the first and second toolbars include an expandable application interface log.

11. The method of claim 1, comprising: displaying a first object interface in a browser, where the first object interface is part of the first workflow.

12. The method of claim 11, comprising: displaying a second object interface in the browser, where the second object interface is also part of the first workflow.

13. The method of claim 12, comprising: displaying a third object interface in the browser, where the third object interface is part of the second workflow.

14. The method of claim 13, where the first, the second, and the third object interfaces interface one or more objects associated with advertisement production or publication applications.

15. A method, comprising:
    receiving user authentication information from a user to access one or more application interfaces;
    determining whether the received authentication information is valid for the user;
    displaying a first application interface of a first ad production application in a web browser, due to the received authentication information being valid, where the first application interface is part of a first step of a first ad production workflow;
    initially displaying a first toolbar in the browser adjacent to the first application interface, due to the received authentication information being valid, where the first toolbar includes a first icon representing the first step of the first workflow;
    displaying a second application interface of a second ad production application in the browser in a same position that the first application interface was displayed, where the second application interface is part of a second step of the first workflow; and
    displaying in the first toolbar a second icon next to the first icon, the second icon representing the second step of the first workflow;
    displaying a third application interface of a third ad production application in the browser in a same position that the first and second application interfaces were displayed, due to the received authentication information being valid, where the third application interface is part of a first step of a second workflow; and
    displaying a second toolbar next to or instead of the first toolbar subsequent to the displaying of the first toolbar, the second toolbar including a third icon representing the first step of the second workflow.

16. The method of claim 15, where the first toolbar is operable to supersede the second toolbar, and the second toolbar is operable to supersede the first toolbar.

17. The method of claim 15, where the first and second toolbars include an expandable application interface log, where the first and the second toolbars include an expandable favorites menu, and where the favorites menu includes preferred application interfaces.

18. A non-transitory computer readable medium, comprising:
- instructions executable by a processor to receive user authentication information from a user to access one or more application interfaces;
- instructions executable by a processor to determine whether the received authentication information is valid for the user;
- instructions executable by a processor to display a first application interface of a first ad production application in a web browser, due to the received authentication information being valid, where the first application interface is part of a first step of a first ad production workflow;
- instructions executable by a processor to initially display a first toolbar in the browser adjacent to the first application interface, due to the received authentication information being valid, where the first toolbar includes a first icon representing the first step of the first workflow;
- instructions executable by a processor to display a second application interface of a second ad production application in the browser in a same position that the first application interface was displayed, where the second application interface is part of a second step of the first workflow;
- instructions executable by a processor to display in the first toolbar a second icon next to the first icon, the second icon representing the second step of the first workflow;
- instructions executable by a processor to display a third application interface of a third ad production application in the browser in a same position that the first and second application interfaces were displayed, due to the received authentication information being valid, where the third application interface is part of a first step of a second workflow; and
- instructions executable by a processor to display a second toolbar next to or instead of the first toolbar subsequent to the displaying of the first toolbar, the second toolbar including a third icon representing the first step of the second workflow.

19. The medium of claim 18, where the first toolbar is operable to supersede the second toolbar, and the second toolbar is operable to supersede the first toolbar.

20. The medium of claim 18, where the first and second toolbars include an expandable application interface log, where the first and the second toolbars include an expandable favorites menu, and where the favorites menu includes preferred application interfaces.

* * * * *